(12) United States Patent
Somoano

(10) Patent No.: US 10,774,978 B2
(45) Date of Patent: Sep. 15, 2020

(54) ADJUSTABLE PORTABLE ELECTRONIC DEVICE HOLDER

(71) Applicant: Alberto Rene Somoano, Miramar, FL (US)

(72) Inventor: Alberto Rene Somoano, Miramar, FL (US)

( * ) Notice: Subject to any disclaimer, the term of this patent is extended or adjusted under 35 U.S.C. 154(b) by 90 days.

(21) Appl. No.: 15/991,043

(22) Filed: May 29, 2018

(65) Prior Publication Data

US 2018/0274715 A1 Sep. 27, 2018

Related U.S. Application Data

(63) Continuation-in-part of application No. 14/927,067, filed on Oct. 29, 2015, now abandoned.

(Continued)

(51) Int. Cl.

| | |
|---|---|
| *F16M 11/04* | (2006.01) |
| *B60R 11/02* | (2006.01) |
| *F16M 13/02* | (2006.01) |
| *A47G 1/17* | (2006.01) |
| *F16M 13/00* | (2006.01) |

(Continued)

(52) U.S. Cl.
CPC ............ *F16M 11/041* (2013.01); *A47G 1/17* (2013.01); *B60R 11/0241* (2013.01); *F16M 11/38* (2013.01); *F16M 13/00* (2013.01); *F16M 13/022* (2013.01); *H04M 1/04* (2013.01); *B60R 2011/0071* (2013.01); *F16B 2/12* (2013.01);

(Continued)

(58) Field of Classification Search
CPC .... F16B 2/12; F16B 7/105; F16B 2001/0035; F16M 11/041; F16M 13/022; F16M 11/38; F16M 13/00; H04M 1/04; A47G 1/17; B60R 11/0241; B60R 2011/0071; B60R 2011/0057; G06F 1/1626; H04B 1/3888

USPC ........... 248/206.5, 683, 558, 309.4; 362/253, 362/191

See application file for complete search history.

(56) References Cited

U.S. PATENT DOCUMENTS 5,822,546 A * 10/1998 George ................. G06F 1/1632 710/303
6,360,083 B1 * 3/2002 Fan ..................... B60R 11/0217 455/575.1

(Continued)

OTHER PUBLICATIONS https://www.youtube.com/watch?v=16BxuhPfKJ4Manfrotto; Discover the new Manfrotta TwistGrip; Sep. 29, 2016 (Year: 2016).*

*Primary Examiner* — Ingrid M Weinhold

(57) ABSTRACT

An adjustable device holder which retains and mounts a portable electronic device onto a surface or an external support structure. The adjustable device holder includes a first engagement jaw, a second engagement jaw, a telescoping frame, and a locking mechanism. The telescoping frame includes a tubular body and a sliding body. The sliding body is slidably positioned within the tubular body to allow for variable length of the telescoping frame. The locking mechanism is mechanically integrated in between the tubular body and the sliding body to secure and set a specific length of the telescoping frame. The first engagement jaw and the second engagement jaw laterally hold the electronic device. The first engagement jaw and the second engagement jaw are positioned parallel and offset to each other along the telescoping frame. The first engagement jaw and the second engagement jaw are each is rotatably mounted to the telescoping frame.

6 Claims, 6 Drawing Sheets

Related U.S. Application Data

(60) Provisional application No. 62/578,075, filed on Oct. 13, 2017.

(51) Int. Cl.
*F16M 11/38* (2006.01)
*H04M 1/04* (2006.01)
*B60R 11/00* (2006.01)
*F16B 7/10* (2006.01)
*F16B 1/00* (2006.01)
*F16B 2/12* (2006.01)

(52) U.S. Cl.
CPC ....... *F16B 7/105* (2013.01); *F16B 2001/0035* (2013.01)

(56) References Cited

U.S. PATENT DOCUMENTS

| | | | | |
|---|---|---|---|---|
| 8,469,325 | B2* | 6/2013 | Yu | G10G 5/005 248/231.51 |
| 9,066,421 | B1* | 6/2015 | Martin | H05K 5/0217 |
| 9,103,487 | B2* | 8/2015 | Hale | G03B 17/566 |
| 9,288,920 | B1* | 3/2016 | Steiner | F16M 11/38 |
| 9,303,832 | B2* | 4/2016 | Sun | F21L 4/04 |
| 9,420,712 | B2* | 8/2016 | Yang | F16M 11/041 |
| 9,423,671 | B2* | 8/2016 | O'Neill | G03B 15/06 |
| 9,573,532 | B2* | 2/2017 | Riddiford | F16M 11/041 |
| 9,618,829 | B2* | 4/2017 | Silva | H04B 1/38 |
| D807,371 | S* | 1/2018 | Bertelle | D14/447 |
| 9,924,005 | B1* | 3/2018 | McElderry | H04M 1/04 |
| D815,104 | S* | 4/2018 | Bertelle | D14/447 |
| 10,128,887 | B2* | 11/2018 | Balmer | A45F 5/10 |
| 10,172,246 | B2* | 1/2019 | Apter | F16B 2/12 |
| 2005/0098692 | A1* | 5/2005 | Yang | F16M 11/10 248/163.1 |
| 2005/0237735 | A1* | 10/2005 | Fan | B60Q 1/2611 362/191 |
| 2006/0061993 | A1* | 3/2006 | Fan | F21V 33/0004 362/253 |
| 2010/0096396 | A1* | 4/2010 | Doig | B60N 3/102 220/737 |
| 2012/0257345 | A1* | 10/2012 | Hulet | H04M 1/04 361/679.32 |
| 2012/0257346 | A1* | 10/2012 | Hulet | H04M 1/04 361/679.32 |
| 2012/0309229 | A1* | 12/2012 | Yang | F16M 11/06 439/620.01 |
| 2013/0005401 | A1* | 1/2013 | Rosenhan | G06F 1/1626 455/557 |
| 2014/0097306 | A1* | 4/2014 | Hale | G03B 17/566 248/122.1 |
| 2014/0209777 | A1* | 7/2014 | Klemin | F16M 13/04 248/544 |
| 2014/0227026 | A1* | 8/2014 | O'Neill | G03B 15/06 403/322.4 |
| 2015/0009672 | A1* | 1/2015 | Girault | G06F 1/1632 362/253 |
| 2015/0047173 | A1* | 2/2015 | Silva | H04B 1/38 29/428 |
| 2015/0072555 | A1* | 3/2015 | Riddiford | F16M 11/041 439/575 |
| 2015/0191124 | A1* | 7/2015 | Du | F16M 13/022 248/205.4 |
| 2015/0192155 | A1* | 7/2015 | Chen | H04N 5/2251 348/376 |
| 2015/0217908 | A1* | 8/2015 | Barron | B65D 45/32 220/324 |
| 2015/0309395 | A1* | 10/2015 | Tomasewski | F16M 11/105 455/575.1 |
| 2015/0359114 | A1* | 12/2015 | Yang | F16M 11/041 248/161 |
| 2015/0380139 | A1* | 12/2015 | Hsu | H04M 1/04 335/285 |
| 2016/0183393 | A1* | 6/2016 | Groom | A45C 11/00 280/33.992 |
| 2016/0206085 | A1* | 7/2016 | Lin | G06F 3/0412 |
| 2016/0352385 | A1* | 12/2016 | O'Neill | G03B 15/06 |

* cited by examiner

ADJUSTABLE PORTABLE ELECTRONIC DEVICE HOLDER

The current application claims a priority to the U.S. Provisional Patent application Ser. No. 62/578,075 filed on Oct. 27, 2017.

FIELD OF THE INVENTION

The present invention relates generally to portable electronic device holders. More particularly, the present invention is an adjustable frame for holding a portable electronic device. The present invention can be adjusted to hold various sizes and types of portable electronic devices

BACKGROUND OF THE INVENTION

With the advancement of the embedded systems, the smart phones are replacing the traditional camera to capture pictures or for video recording purposes. Nowadays, smart phones offer extensive features to the user to add attributes to capture picture or video such as change of color, background change, pixel size, dimensions of the picture of a cropping feature. The users are now adapted to the smart phones and smart phones have become the first preference to capture pictures or in recording videos. Moreover, people are nowadays excited to take selfies and share it with their friends. Users want to see themselves in the picture, so they can enjoy the moment completely. Usually, they encounter a problem while holding the smart phone or taking the selfies. Usually, the user holds the smart phone with one hand and clicks on a button to capture the image. However, this process has many disadvantages. Many times, the smart phone gets dropped from the hand due to improper handling which results in unnecessary damage to the smart phone. Moreover, the user can only hold the smart phone at the arm length which usually does not capture the entire view of the surroundings. In this way, the captured selfie is limited to the person's vicinity and hence does not capture the entire situation or surrounding. In addition to that, the user often fails to hold the smart phone stable enough which affects the quality of the captured image. The camera of the smart phone needs to remain stable for a few seconds to capture the image correctly. But consistent small vibrations, due to blood pressure, vibrates the hand of the user minutely which therefore becomes the reason of non-stability and yields blurry pictures.

It is therefore an objective of the present invention to provide an adjustable portable electronic device holder. The present invention is designed to adjust to hold various sizes and types of portable electronic devices both vertically and horizontally. The present invention can be locked to one size to securely hold a portable electronic device. The present invention can be magnetically mounted to any metal surface to aid in capturing pictures or images. The present invention can be mounted to a stand device such as, but not limited to a tripod stand both vertically and horizontally.

DETAIL DESCRIPTIONS OF THE INVENTION

All illustrations of the drawings are for the purpose of describing selected versions of the present invention and are not intended to limit the scope of the present invention.

The present invention generally relates to accessories for portable electronic devices. More specifically, the present invention is a mount/holder for an electronic device such as a smartphone or a tablet. The present invention is adjustable in order to receive and hold a variety of different devices. Additionally, the present invention can hold the portable electronic device on any surface; the present invention can be utilized on it's on platform to hold a portable electronic devise both vertically and horizontally; the present invention can be mounted to a tripod or stand with metal protrusions that engage and lock with the circular recesses on the invention both vertically and horizontally; the present invention can be mounted to any after-market tripod from a small desk top tripod to full size floor tripod or other similar camera stand with a screw thumb both vertically and horizontally; the present invention can be mounted to any metallic surface magnetically without the use of a tripod or stand.

Figure 1:
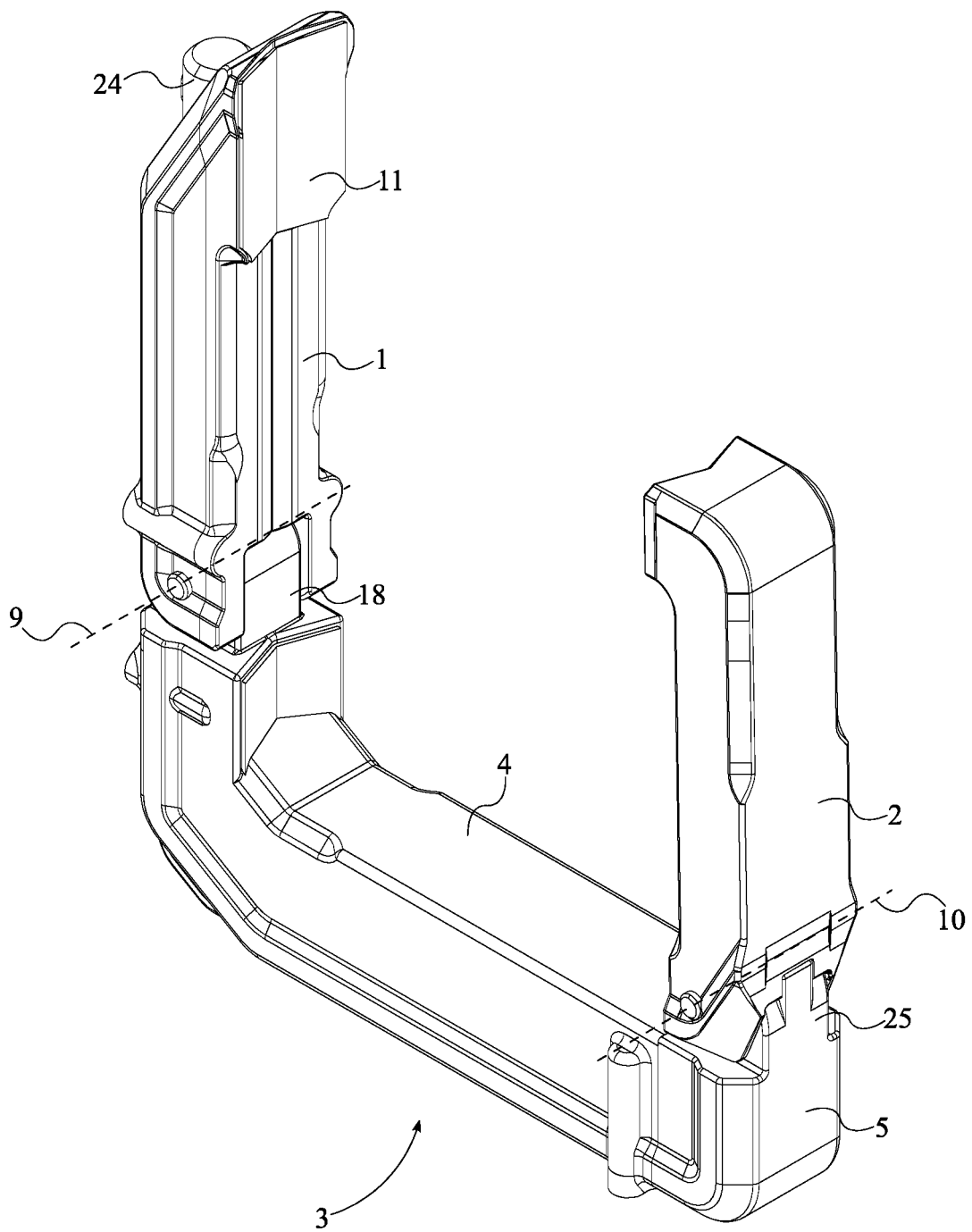
FIG. 1 is a perspective view of the present invention in a functional configuration.
Figure 5:
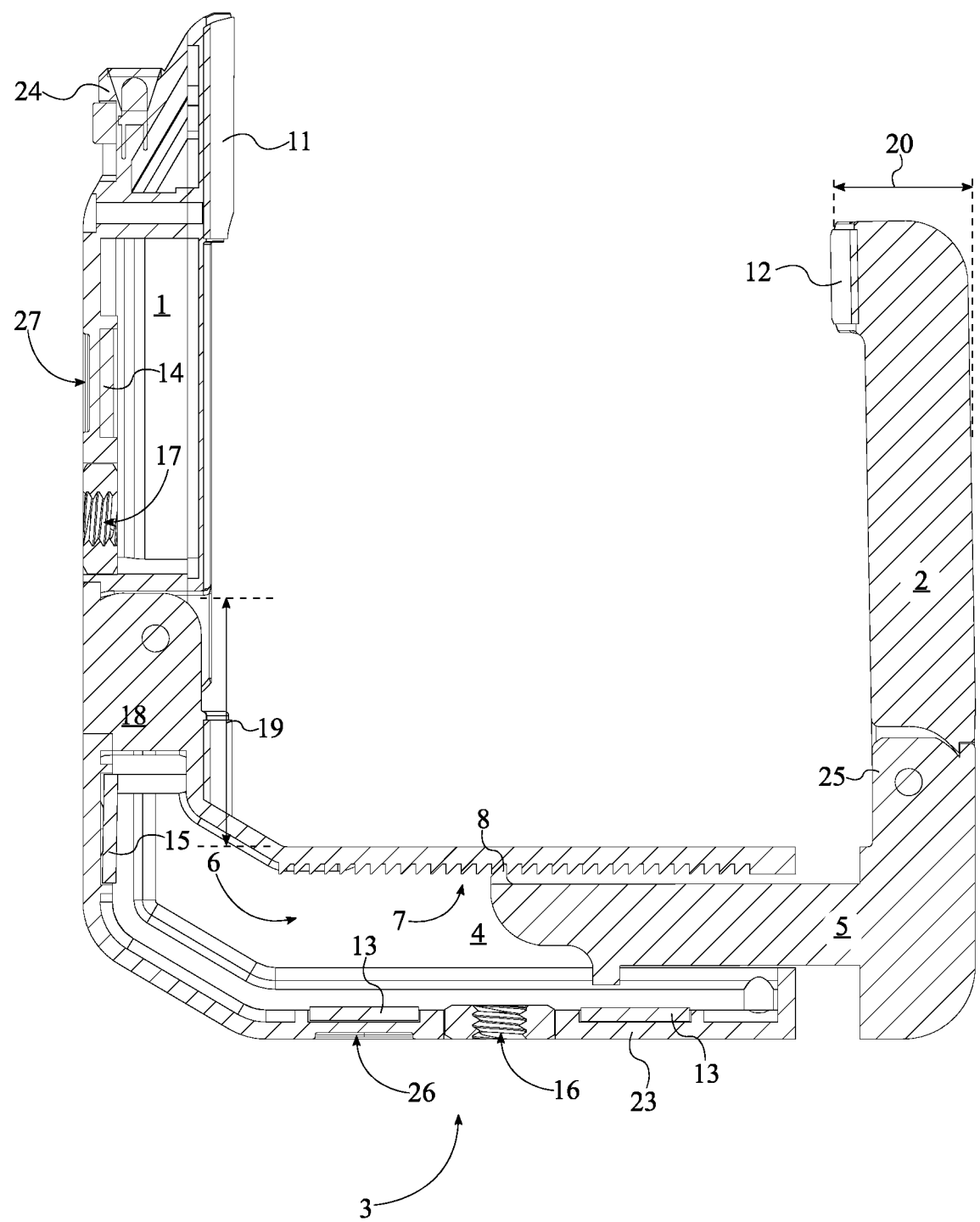
FIG. 5 is a cross-sectional cut view of the present invention.

Referring to FIG. 1 and FIG. 5, the present invention comprises a first engagement jaw 1, a second engagement jaw 2, a telescoping frame 3, and a locking mechanism 6. The first engagement jaw 1, the second engagement jaw 2, and the telescoping frame 3 outline a U-shaped structure that receives and holds a portable electronic device from three different sides. More specifically, the first engagement jaw 1 and the second engagement jaw 2 are each an elongated structure with a rectangular cross-section which laterally support the portable electronic device. The telescoping frame 3 supports the first engagement jaw 1 and the second engagement jaw 2, and dictates the distance between first engagement jaw 1 and the second engagement jaw 2. Resultantly, a receiving area of the present invention may be adjusted to accommodate a variety of different sized portable electronic devices. In particular, the telescoping frame 3 comprises a tubular body 4 and sliding body 5. The tubular body 4 receives and supports the sliding body 5. The sliding body 5 is slidably positioned within the tubular body 4 in order to vary the overall length of the telescoping frame 3. The sliding body 5 translates in and out of the tubular body 4 to vary the overall length of the telescoping frame 3. The locking mechanism 6 secures the sliding body 5 to the tubular body 4 at various settings in order to adequately hold the portable electronic device in between the first engagement jaw 1 and the second engagement jaw 2. Thus, the locking mechanism 6 is mechanically integrated in between the tubular body 4 and the sliding body 5. A variety of devices and mechanisms may be used as the locking mechanism 6.

The first engagement jaw 1 and the second engagement jaw 2 are positioned parallel and offset to each other along the telescoping frame 3 to yield an overall U-shape. For portability and storage purposes, the present invention may be configured into a collapsed configuration. For this, the first engagement jaw 1 is pivotably mounted to the tubular body 4 about a first rotation axis 9. Additionally, the second engagement jaw 2 is pivotably mounted to the sliding body 5 about a second rotation axis 10. Furthermore, the first rotation axis 9 and the second rotation axis 10 are oriented parallel to each other. Resultantly, the first engagement jaw 1 and the second engagement jaw 2 may be rotated inwards towards the telescoping frame 3 in order to reduce the overall profile of the present invention. In the collapsed configuration, the present invention is small enough to fit into a shirt or pants pocket for easy transportation.

Figure 3:
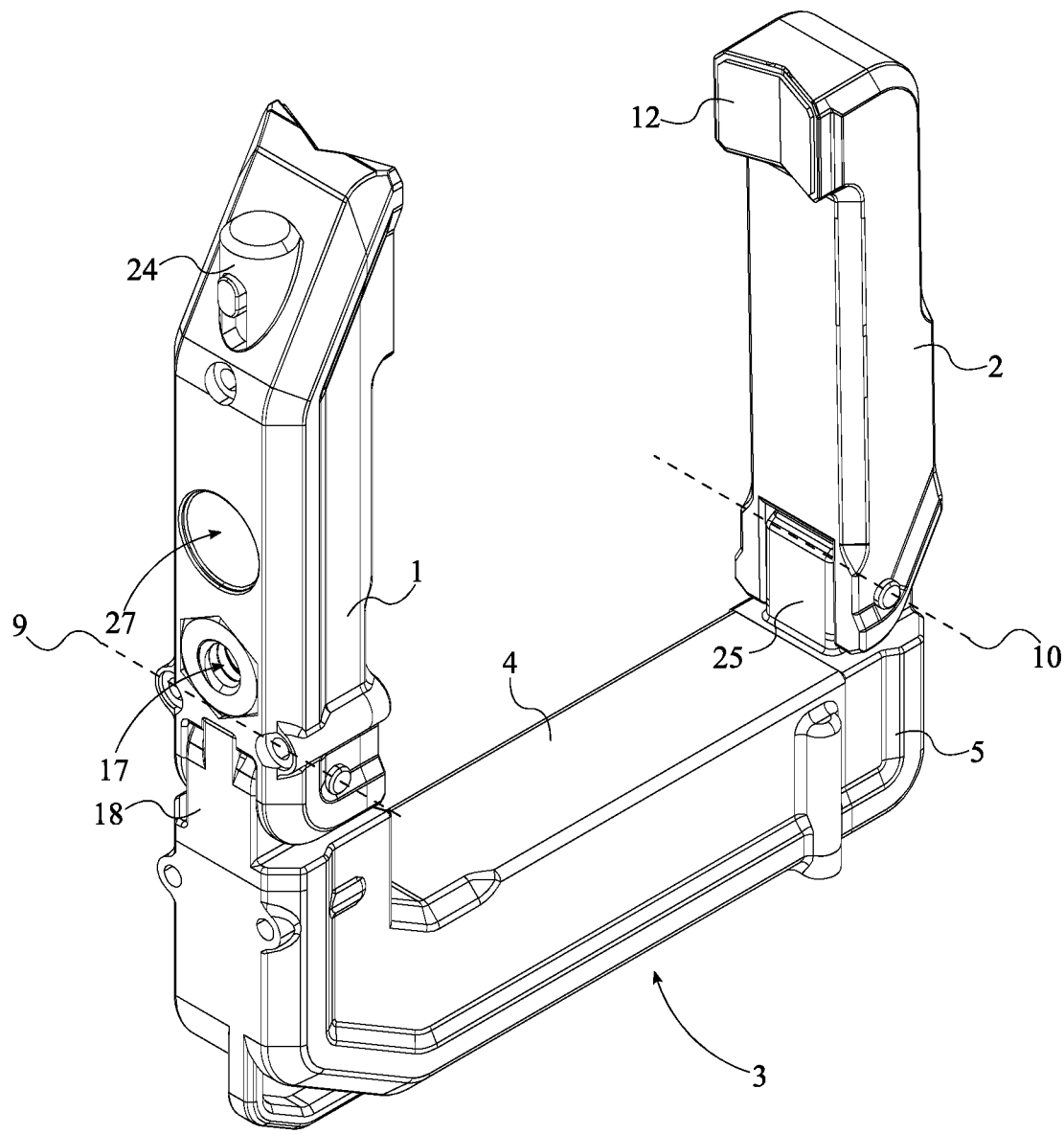
FIG. 3 is a rear perspective view of the present invention.
Figure 6:
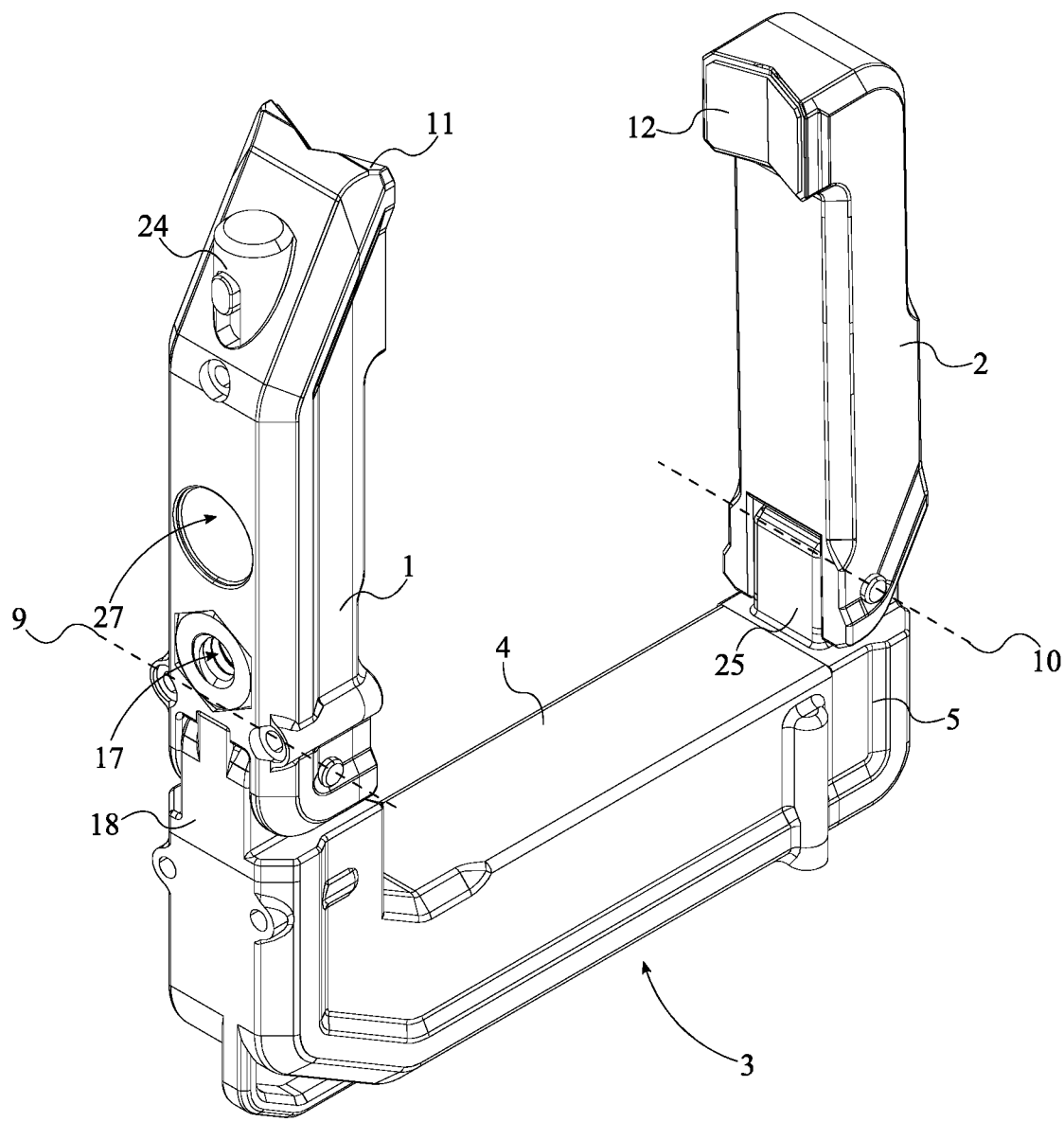
FIG. 6 is a perspective view of an alternative embodiment of the present invention.

Referring to FIG. 3, to support and hold the portable electronic device, the present invention is positioned into a functional configuration. In the functional configuration, the first engagement jaw 1 is positioned perpendicular to the telescoping frame 3. Parallel to the first engagement jaw 1, the second engagement jaw 2 is also positioned perpendicular to the telescoping frame 3. In order to alter the distance between the first engagement jaw 1 and the second engagement jaw 2, the user simply slides the sliding body 5 relative to the tubular body 4. This allows the present invention to be customized for different portable electronic devices. The junction between the telescoping frame 3 and the first engagement jaw 1 may include a radial stop which prevents the first engagement jaw 1 from rotating any degree further then 90 degrees from the telescoping frame 3. Similarly, the junction between the telescoping frame 3 and the second engagement jaw 2 may include a radial stop which prevents the first engagement jaw 2 from rotating any degree further then 90 degrees from the telescoping frame 3. An example of a radial stop is seen in FIG. 6, wherein a physical obstruction is integrated adjacent to the first rotation axis 9 and the second rotation axis 10 which interferes with the rotation motion of the first engagement jaw 1 and the second engagement jaw 2.

In the preferred embodiment of the present invention, the locking mechanism 6 is a ratchet-type locking mechanism 6. In particular, the locking mechanism 6 comprises a toothed track 7 and a locking paw 8. The toothed track 7 is the first interconnecting component of the locking mechanism 6 which is connected to the tubular body 4. The locking paw 8 is the second interconnecting component of the locking mechanism 6 which is connected to the sliding body 5. The toothed track 7 is a set of teeth arranged in a linear fashion. The toothed track 7 is oriented along the tubular body 4 such that when the locking mechanism 6 is engaged, the locking mechanism 6 provides a means securing the sliding body 5 at various lengths along the tubular body 4, thus increasing or decreasing the distance between the first engagement jaw 1 and the second engagement jaw 2. Additionally, referring to FIG. 5, the toothed track 7 is internally connected within the tubular body 4. The locking paw 8 is an engagement tooth designed to interlock with any tooth from the toothed track 7. The locking paw 8 is positioned adjacent to the sliding body 5, opposite the second engagement jaw 2. In particular, the locking paw 8 is laterally and terminally connected to the sliding body 5, adjacent to the toothed track 7. When the sliding body 5 is positioned within the tubular body 4, the locking paw 8 is mechanically engaged to the toothed track 7 to secure the sliding body 5 within the tubular body 4. The ratchet-type locking mechanism 6 auto-locks when holding the portable electronic device as the second engagement jaw 2 tilts slightly away from the portable electronic device, thus tilting the sliding body 5 and forcing the locking paw 8 to further engage with the toothed track 7. To disengage the locking mechanism 6, the user simply applies a force onto the sliding body 5 in the direction towards the tubular body 4, thus pushing the locking paw 8 away from the toothed track 7. Another means of disengaging the locking mechanism 6 is for the user to simply pull the portable electronic device out vertically, or along the length of the first engagement jaw 1 and the second engagement jaw 2. This releases the locking force being applied to the locking paw 8 and, thus, allows the sliding body 5 to translate relative to the tubular body 4. Although, in alternative embodiments of the present invention, release buttons or release mechanisms may be used to disengage the locking mechanism 6. Furthermore, in alternative embodiments, tensioning mechanisms may be used to ensure that the locking paw 8 stays engaged with the toothed track 7.

Figure 4:
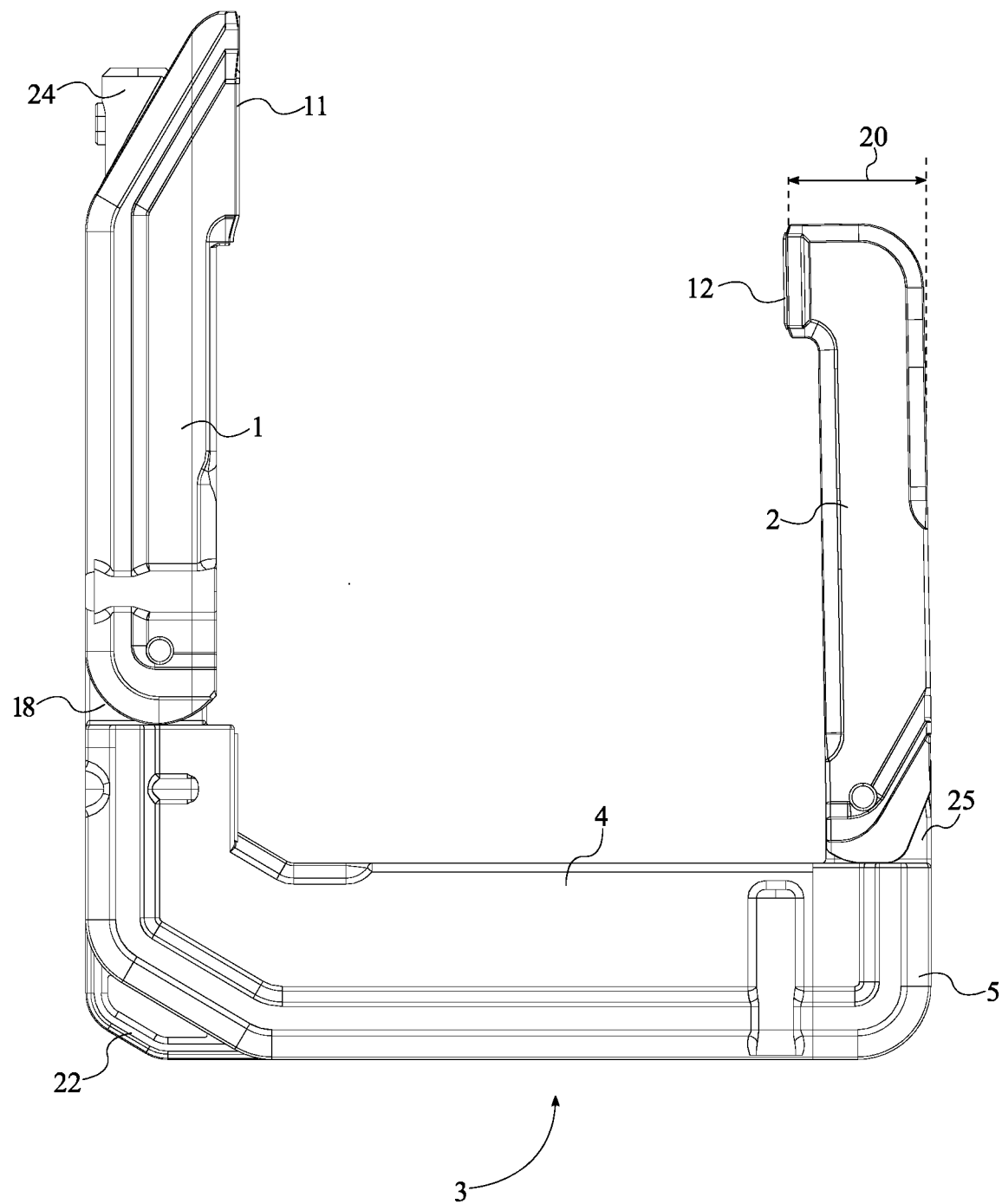
FIG. 4 is a front view of the present invention.

Referring to FIG. 4 and FIG. 5, the present invention further comprises a first pad 11, a second pad 12, an at least one first magnet 13, an at least one second magnet 14, a third magnet 15, a first mounting fastener 16, a second mounting fastener 17, a first pivot mount 18, a second pivot mount 25, and a loop 22. The first pad 11 and the second pad 12 provide protection and grip for the portable electronic device being held/supported by the present invention. The first pad 11 and the second pad 12 are each an elongated rectangular extrusion composed of a rubber-type material, although alternative materials and designs/shapes may also be utilized. The first pad 11 and the second pad 12 are each positioned in between the first engagement jaw 1 and the second engagement jaw 2. In particular, the first pad 11 is positioned adjacent to the first engagement jaw 1, opposite the telescoping frame 3. Additionally, the first pad 11 is adjacently connected along the first engagement jaw 1 to cover a lateral surface of the first engagement jaw 1. Similarly, the second pad 12 is positioned adjacent to the second engagement jaw 2, opposite the telescoping frame 3; and, the second pad 12 is adjacently connected along the second engagement jaw 2 to cover a lateral surface of the second engagement jaw 2. Resultantly, the first pad 11 and the second pad 12 are oriented towards each other. When the first engagement jaw 1 and the second engagement jaw 2 when the present invention is positioned into the functional configuration. The first pad 11 and the second pad 12 act as the interface surface and press against the sides of the portable electronic device.

The first pivot mount 18 is a support structure for the first engagement jaw 1. More specifically, the first pivot mount 18 mechanically couples the first engagement jaw 1 to the tubular body 4. The first pivot mount 18 is the preferred mounting means as the first pivot mount 18 offsets the first rotation axis 9 from the telescoping frame 3 to allow for the present invention to be positioned into the collapsed configuration. The first pivot mount 18 is positioned in between the first engagement jaw 1 and the tubular body 4. Additionally, the first pivot mount 18 is perpendicularly connected to the tubular body 4 as seen in FIG. 5. Opposite the tubular body 4, the first engagement jaw 1 is terminally and pivotably connected to the first pivot mount 18 about the first rotation axis 9. The second pivot mount 25 is a support structure for the second engagement jaw 2. More specifically, the second pivot mount 25 mechanically couples the second engagement jaw 2 to the sliding body 5. The second pivot mount 25 is the preferred mounting means as the second pivot mount 25 offsets the second rotation axis 10 from the telescoping frame 3 to allow for the second engagement jaw 2 to fold fully against the telescoping frame 3. The second pivot mount 25 is positioned in between the second engagement jaw 2 and the sliding body 5. Additionally, the second pivot mount 25 is perpendicularly connected to the sliding body 5 as seen in FIG. 5. Opposite the sliding body 5, the second engagement jaw 2 is terminally and pivotably connected to the second pivot mount 25 about the second rotation axis 10. This configuration ensures that the collapsed configuration yields the smallest possible profile.

Figure 2:
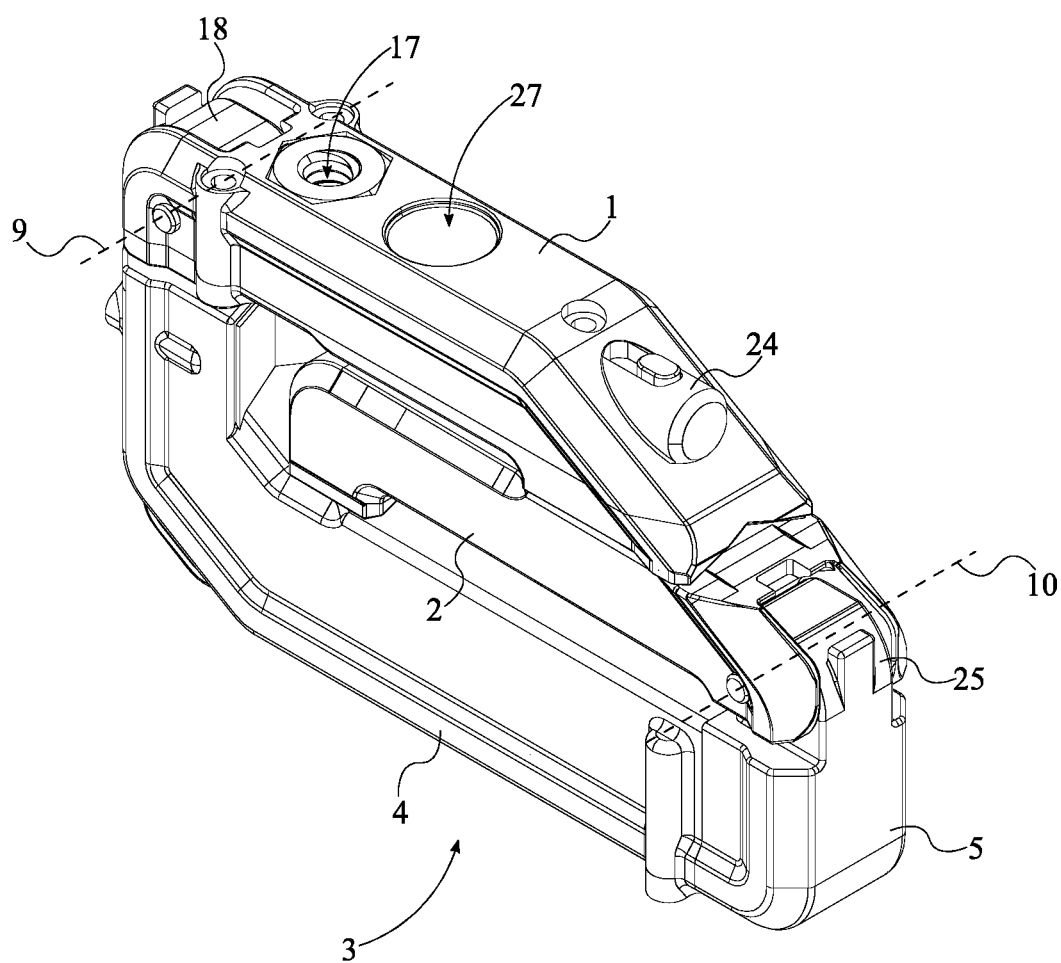
FIG. 2 is a perspective view of the present invention in a collapsed configuration.

Referring to FIG. 2, wherein the telescoping frame 3, the first engagement jaw 1, and the second engagement jaw 2 are configured into the collapsed configuration. More specifically, in the collapsed configuration, the first engagement jaw 1, the second engagement jaw 2, and the telescoping frame 3 are positioned parallel and adjacent to each other. For this, the second engagement jaw 2 is rotated about the second rotation axis 10 towards the telescoping frame 3 until the second engagement jaw 2 is positioned directly adjacent to the telescoping frame 3. Next, the first engagement jaw 1 is rotated about the first rotation axis 9 towards the second engagement jaw 2. Resultantly, the first engagement jaw 1 is positioned adjacent to the second engagement jaw 2, opposite to the telescoping frame 3. The first pivot mount 18 provides clearance for the second engagement jaw 2 to fold directly under the first engagement jaw 1 in a flush and a complimentary manner. Referring to FIG. 4 and FIG. 5, it is preferred that a length 19 of the first pivot mount 18 is greater than a width 20 of the second engagement jaw 2. Additionally, it is preferred that a length of the second engagement jaw 2 is less than a length of the tubular body 4. This ensures that the second engagement jaw 2 is able to fully fold against the telescoping frame 3.

The first magnet 13, the second magnet 14, the third magnet 15, the first mounting fastener 16, and the second mounting fastener 17 allow the present invention to be attached and mounted to an external support structure such as a companion tripod stand. The first magnet 13, the second magnet 14, and the third magnet 15 are each a disk-shaped magnet designed to act as a fastener to magnetically attach the present invention to an external structure; i.e. adhere to an external magnet or an external metal-based surface. The first magnet 13 magnetically attaches the present invention at a bottom surface of the telescoping frame 3. More specifically, the first magnet 13 is positioned adjacent to the telescoping frame 3, opposite the first engagement jaw 1. Additionally, the first magnet 13 is integrated into a bottom sidewall 23 of the tubular body 4. A variety of integration methods may be utilized. One method includes the first magnet 13 being internally connected within the tubular body 4. The first magnet 13 allows the present invention to attach to an external structure, i.e. a metallic surface, through/by the tubular body 4. Additionally, the first magnet 13 allows for the present invention to attach to an external stand, such as a tripod, through complimentary magnets integrated into the said external stand. Referring to the cross-section in FIG. 5, the at least one first magnet 13 preferably comprises a first magnet disk and a second magnet disk. The first magnet disk and the second magnet disk are linearly distributed along the tubular body 4 in order to provide additional and symmetrical support to the present invention.

The second magnet 14 and the third magnet 15 allow the present invention to be magnetically attached to an external structure through/by the first engagement jaw 1 and the first pivot mount 18. This allows the user to orient and secure the portable electronic device being held by the present invention in a horizontal orientation on a horizontal surface or an external stand/mount. Referring to FIG. 5, the second magnet 14 is positioned adjacent to the first engagement jaw 1, opposite to the second engagement jaw 2. Additionally, the second magnet 14 is laterally integrated into the first engagement jaw 1. A variety of integration methods may be utilized. One method includes the second magnet 14 being internally connected within the first engagement jaw 1. The third magnet 15 provides additional support to the second magnet 14. The third magnet 15 is terminally positioned to the tubular body 4, opposite the sliding body 5. Additionally, the third magnet 15 is integrated into the tubular body 4. Resultantly, when the present invention is attached to an external structure through/by the first engagement jaw 1, the present invention is held at two separate points. In alternative embodiments, the third magnet 15 is integrated into the tubular body 4 or is partially integrated into both the first pivot mount 18 and the tubular body 4.

The present invention also may be mounted onto a stand through circular extrusions, an interlocking method. For this, the present invention further comprises an at least one first recessed portion 26 and an at least one second recessed portion 27. The first recessed portion 26 and the second recessed portion 27 are sized and positioned to receive a complimentary protrusion of an external stand, tripod, or other similar structure. Additionally, the first recessed portion 26 and the second recessed portion 27 are each preferably circular in cross-section as the standard protrusions used in today's market are cylindrically shaped. The first recessed portion 26 allows an external structure to interlock to the bottom sidewall 23 of the tubular body 4. More specifically, the first recessed portion 26 is positioned coincident with the first magnet 13. Additionally, the first recessed portion 26 externally traverses into the bottom sidewall 23. Similarly, the second recessed portion 27 allows an external structure to interlock to the lateral sidewall of the first engagement jaw 1. In particular, the second recessed portion 27 is positioned coincident with the second magnet 14. Additionally, the second recessed portion 27 is positioned adjacent to the first engagement jaw 1, opposite to the second engagement jaw 2 such that the present invention may be mounted sideways. Furthermore, the second recessed portion 27 normally traverses into the first engagement jaw 1. The size, depth, geometry, and positioning of the first recessed portion 26 and the second recessed portion 27 are subject to change to fit a variety of external support structures.

One of the main mounting methods for tripods and other photographic equipment and accessories is attachment/mounting through a thumbscrew which mates with a receptive hole of the camera, camera holder, and smartphone. The present invention may be attached to any tripod or other similar equipment with a thumbscrew through the first mounting fastener 16 and the second mounting fastener 17. The first mounting fastener 16 allows the present invention to be mounted through the telescoping frame 3 while the second mounting fastener 17 allows the present invention to mounted through the first engagement jaw 1. More specifically, the first mounting fastener 16 is positioned adjacent to the tubular body 4, opposite the first engagement jaw 1. Additionally, the first mounting fastener 16 is normally integrated into the tubular body 4. The second mounting fastener 17 is positioned adjacent to the first engagement jaw 1, opposite the second engagement jaw 2. Additionally, the second mounting fastener 17 is normally integrated into the first engagement jaw 1. In the preferred embodiment, the first mounting fastener 16 and the second mounting fastener 17 each comprise a hole and a threaded nut. For the first mounting fastener 16, the hole normally traverses into the tubular body 4 and is sized to receive the threaded nut of the first mounting fastener 17. For the second mounting fastener 17, the hole normally traverses into the first engagement jaw 1 and is sized to receive the threaded nut of the second mounting fastener 17. The threaded nut is a small piece of metal, typically square or hexagonal, that has a central threaded hole made to screw onto a bolt to mechanically couple two separate components. The threaded nut is concentrically connected within the hole. For the present invention, the threaded nut of the first mounting fastener 16 and the threaded nut of the second mounting fastener 17 receive and couple to the thumbscrew of an external structure. In an alternative embodiment, the first mounting fastener 16 and the second mounting fastener 17 are each a threaded hole. Furthermore, in alternative embodiments of the present invention, alternative methods, devices, and mechanisms may be used to allow the present invention to couple to an external structure.

Referring to FIG. 4, the loop 22 allows the present invention to be connected to a keychain, a lanyard, or any other similar tether for storage and transportation purposes. The loop 22 is positioned adjacent to the telescoping frame 3, opposite the first engagement jaw 1. Additionally, the loop 22 is externally mounted to the telescoping frame 3.

In the preferred embodiment of the present invention, the first engagement jaw 1 and the second engagement jaw 2 each include a recessed/concave portion sized to receive and secure the portable electronic device. For this, the first pad 11 and the second pad 12 are sized complimentary to the recessed/concave portion. As seen in FIG. 6, the recessed portion is terminally positioned on the first engagement jaw 1 and the second engagement jaw 2, opposite to the telescoping frame 3. One particular design for the recessed portion is a triangular-shaped cross-section. The triangular-shaped design provides additional support to ensure that the portable electronic device does not slide forwards or backwards in between the first engagement jaw 1 and the second engagement jaw 2.

In one embodiment, the present invention further comprises a flashlight 24. The flashlight 24 is an elongated cylindrically shaped flashlight 24 that provides additional utility function to the present invention. A variety of designs may be used for the flashlight 24. The flashlight 24 is positioned along the first engagement jaw 1 and terminally integrated into the first engagement jaw 1. Additionally, the flashlight 24 is oriented away from the telescoping frame 3 for easy handling and lighting. The flashlight 24 allows the user to utilize the present invention in any low or no light situations. Thus, the present invention is versatile enough to be used in any indoor venue and any outdoor venue, from camping to hiking etc.

The geometry and build of the present invention allow for mounting the portable electronic device in a vertical and a horizontal orientation on any surface to hold and support the portable electronic device.

Although the invention has been explained in relation to its preferred embodiment, it is to be understood that many other possible modifications and variations can be made without departing from the spirit and scope of the invention as hereinafter claimed.

What is claimed is:

1. An adjustable portable electronic device holder comprising:
   a first engagement jaw;
   a second engagement jaw;
   a telescoping frame;
   a locking mechanism;
   a flashlight;
   at least one first magnet;
   at least one second magnet;
   a third magnet;
   a first pad;
   a second pad;
   the telescoping frame comprising a tubular body and a sliding body;
   the sliding body being slidably positioned within the tubular body;
   the locking mechanism being mechanically integrated in between the tubular body and the sliding body;
   the first engagement jaw and the second engagement jaw being positioned offset to each other along the telescoping frame;
   the first engagement jaw being pivotably mounted to the tubular body about a first rotation axis;
   the second engagement jaw being pivotably mounted to the sliding body about a second rotation axis;
   the first rotation axis and the second rotation axis being oriented parallel to each other;
   the flashlight being integrated into a terminal end of the first engagement jaw;
   the flashlight non-adjustably protruding from the terminal end along a direction;
   the direction being oriented away from the first rotation axis towards the terminal end of the first engagement jaw;
   the at least one first magnet being integrated into a bottom sidewall of the tubular body;
   the at least one second magnet being integrated into a lateral sidewall of the first engagement jaw;
   the third magnet being integrated into a lateral sidewall of the tubular body;
   the third magnet and the second engagement jaw being positioned offset to each other along the telescoping frame;
   the first pad and the telescoping frame being positioned offset to each other along the first engagement jaw;
   the second pad and the telescoping frame being positioned offset to each other along the second engagement jaw;
   the first pad being connected along one end of the first engagement jaw;
   the second pad being connected along one end of the second engagement jaw;
   the first pad and the second pad each having a V-shaped cross section;
   the telescoping frame, the first engagement jaw and the second engagement jaw being selectively configured into a functional configuration and a collapsed configuration;
   the first engagement jaw being positioned perpendicular to the telescoping frame, the second engagement jaw being positioned perpendicular to the telescoping frame, and the first pad and the second pad being oriented towards each other, in response to the telescoping frame, the first engagement jaw and the second engagement jaw being configured into the functional configuration;
   the first engagement jaw, the second engagement jaw and the telescoping frame being positioned parallel to each other, and the second engagement jaw being positioned in between the first engagement jaw and the telescoping frame, in response to the telescoping frame, the first engagement jaw and the second engagement jaw being configured into the collapsed configuration;
   an enclosed loop;
   the enclosed loop being externally integrated with an intermediate sidewall of the tubular body;
   the intermediate sidewall of the tubular body being located in between the bottom sidewall of the tubular body and the lateral sidewall of the tubular body; and the intermediate sidewall of the tubular body being obliquely aligned with each of the bottom sidewall of the tubular body and the lateral sidewall of the tubular body.

2. The adjustable portable electronic device holder as claimed in claim 1 comprising:
the locking mechanism comprising a toothed track and a locking paw;
the toothed track being oriented along the tubular body;
the toothed track being internally connected within the tubular body;
the locking paw and the second engagement jaw being positioned offset to each other along the sliding body;
the locking paw being connected to one end of the sliding body; and
the locking paw being mechanically engaged to the toothed track.

3. The adjustable portable electronic device holder as claimed in claim 1 comprising:
a first mounting fastener;
a second mounting fastener;
the first mounting fastener being integrated into the bottom sidewall of the tubular body; and
the second mounting fastener being integrated into the lateral sidewall of the first engagement jaw.

4. The adjustable portable electronic device holder as claimed in claim 1 comprising:
a first pivot mount;
a second pivot mount;
the first pivot mount being positioned in between the first engagement jaw and the tubular body;
the second pivot mount being positioned in between the second engagement jaw and the sliding body;
the first pivot mount being perpendicularly connected to the tubular body;
the second pivot mount being perpendicularly connected to the sliding body;
the first engagement jaw being terminally and pivotably connected to the first pivot mount about the first rotation axis; and
the second engagement jaw being terminally and pivotably connected to the second pivot mount about the second rotation axis.

5. The adjustable portable electronic device holder as claimed in claim 4, a length of the first pivot mount is greater than a width of the second engagement jaw.

6. The adjustable portable electronic device holder as claimed in claim 1 comprising:
at least one first recessed portion;
at least one second recessed portion;
the at least one first recessed portion being positioned coincident with the at least one first magnet;
the at least one second recessed portion being positioned coincident with the at least one second magnet;
the at least one first recessed portion externally traversing into the bottom sidewall of the tubular body; and
the at least one second recessed portion externally traversing into the lateral sidewall of the first engagement jaw.

* * * * *